United States Patent [19]
Han

[11] Patent Number: 5,929,435
[45] Date of Patent: *Jul. 27, 1999

[54] APPARATUS AND METHOD FOR AUTOMATICALLY DETECTING AND OPTICALLY SCANNING GRAPHIC MATTER

[75] Inventor: Loi Han, Alhambra, Calif.

[73] Assignee: Microtek International, Inc., Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,434

[22] Filed: Jul. 3, 1996

[51] Int. Cl.⁶ .................................................. H01J 3/14
[52] U.S. Cl. ...................... 250/234; 250/559.4; 358/486
[58] Field of Search .................... 250/234, 559.4, 250/559.06, 559.36; 358/475, 256, 486, 488, 474; 382/319

[56] References Cited

U.S. PATENT DOCUMENTS

| | | | |
|---|---|---|---|
| 4,686,577 | 8/1987 | Arimoto | 358/256 |
| 5,105,092 | 4/1992 | Natsubori et al. | 250/559.06 |
| 5,202,556 | 4/1993 | Kawabata et al. | 250/559.36 |
| 5,568,281 | 10/1996 | Kochis et al. | 358/475 |

*Primary Examiner*—Que T. Le
*Attorney, Agent, or Firm*—Small, Larkin, LLP

[57] ABSTRACT

An optical scanning apparatus for retrieving digital electronic images representative of opaque objects. The apparatus is equipped with a reflective scanning platform for supporting an opaque object thereon. A scanning camera, equipped with a light source for illuminating the platform, is aligned to retrieve images from objects placed upon the reflective scanning platform. An object sensor included with the scanning camera detects the presence of such images. Using the sensor during scanning, provides automotive detection of the end of the object thereby reducing the scan time.

20 Claims, 3 Drawing Sheets

REFLECTIVE TARGET

APPARATUS AND METHOD FOR AUTOMATICALLY DETECTING AND OPTICALLY SCANNING GRAPHIC MATTER

BACKGROUND OF THE INVENTION

1. Field of the Invention

The present invention relates to an apparatus and method for automatically detecting and reading graphic matter and more particularly to the detection of documents on a flat bed scanner.

2. Description of the Related Art

Recent developments in the use of high speed, low cost digital electronic imaging systems to process, transmit and display digital information have substantially increased the demand for optical scanners to convert graphic matter, such as text and pictures, into a digital electronic form. A variety of optical scanners, including facsimile machines and digital copiers, have been developed to meet this growing demand. Typically, optical scanners fall within two categories, reflective scanners for opaque objects, such as documents and photographs, and transmissive scanners for transparent objects, such as slides and transparencies.

Reflective scanners are used with opaque objects and project light onto the side of the object to be scanned. When illuminated by the reflected light, the object is viewable by a digital camera which in turn converts the image into a digital electronic form. The conventional reflective scanner operates by moving the digital camera row by row relative to the object to be scanned.

In one conventional embodiment, the relative movement of the digital camera with respect to the object may be achieved using a document feeder to draw the object, such as a document, across the field of view of the digital camera. The document feeder often comes with a paper tray to enable the scanner to draw several pages, one at a time, across the scanner. While suitable for many general applications, the scanner with a document feeder cannot accommodate odd-sized or bound materials. In addition, the document feeder can jam the paper or draw-in the paper at an angle causing the document to misalign with the digital camera. Alignment problems of this type occur most often when the document has an unusual thickness or paper size. Unusual documents when misread by the scanner can result in poor image quality when viewed electronically. Typically, such scanners are used in applications where the volume of materials scanned outweigh considerations for image quality. However, a skewed image is undesirable in desk top publishing applications where the quality of the image is desired over volume.

For applications where quality of the image is desired, an optical scanner of the type known as a flat bed scanner is used. Such scanners typically use a transparent platen to support the image to be scanned. The image is placed by the operator on the platen. Once positioned on the platen, the document remains stationary relative to the platen. In this type of scanner, the digital camera and a reflective light source move relative to the platen. This type of relative movement can be achieved conventionally by moving the platen and document across a stationary digital camera and light source. Alternatively, this type of relative movement can be achieved by moving the digital camera and light source along rails within the base housing relative to the platen and document. Regardless of which method of relative movement is used, the light source projects light upon the portion of the object within the field of view of the camera. As documents and photographs are moved relative to the scanning camera, the light source and camera cooperate to incrementally scan across an image line by line. While suitable for high quality image processing, the flat bed scanner is not well suited for processing several pages of documents at a time. This problem is due in part to the need for manual adjustment of each image on the platen. The problem is compounded by the software and scanner which must then be manually continued by the operator to begin scanning the image. Such manual configuration may include configuring the scanner to recognize the dimensions of the paper and manually signaling the scanner that an image has been placed on the platen.

OBJECTS AND SUMMARY OF THE INVENTION

It is an object of the present invention to provide an optical flat bed scanning apparatus for scanning images that can automatically detect the presence of an image.

It is an additional object of the present invention to provide an optical flat bed scanning apparatus for scanning images that can automatically detect the size of image.

It is advantage of the present invention to achieve the objects of the present invention while permitting the manual placement of the image to achieve the desired orientation.

It is a feature of the present invention to provide an optical sensor on the scanning camera to detect the presence and size of an image placed on a reflective scanning platform.

In accordance with the objects of the present invention, a conventional scanner housing is provided with a scanning camera comprising a Charge Coupled Device (CCD) and a lens. A conventional reflective scanning platform includes a platen located on the upper surface of the housing. The scanning camera with the light source are moveable relative to the reflective platform. A sensor capable of detecting the presence of an image is mounted on the scanning camera and directed towards the reflective platform.

The present invention advantageously utilizes an optical sensor which can detect the presence of an image optically. Luminance is the measurement of light (lumens) reflected off a surface per unit area. Light when projected onto an image will contain a measurable luminance that can be detected by an optical sensor. The optical sensor is able to measure the luminance from the reflective platform.

The sensor is electronically connected to a controller circuit including a Central Processing Unit (CPU) within the scanner. The CPU is configured by software to receive the sensor signals and detect the presence or absence of a image on the platform. The sensor signals are compared to a predetermined threshold. If the measured luminance is below the threshold, then the controller circuit determines no image is in place. If the measured luminance is above the threshold, then the controller circuit determines an image is in place. The controller circuit, in response to detecting the presence of an image, begins scanning the image by incrementally moving the scanning camera, and sensor, relative to the platform line-by-line. As the scanning procedure continues, the sensor may be moved past the end of the document. When this occurs the controller circuit is signaled that the end of the page has been reached. The controller circuit completes scanning of the page and stops and resets the scanning camera for the next image. The image is then removed and a new image maybe positioned on the platform. In this way, the image may be manually positioned to achieve the desired alignment of the image; however, the scanning apparatus operates to automatically scan and detect the size of the image to be scanned. Accordingly, the present invention saves time by reducing the number of manual steps needed when using a flat bed scanner.

BRIEF DESCRIPTION OF THE DRAWINGS

The objects and advantages of the present invention will become more readily apparent to those ordinarily skilled in the art after viewing the following detailed description and accompanying drawings wherein.

DETAILED DESCRIPTION

Figure 1:
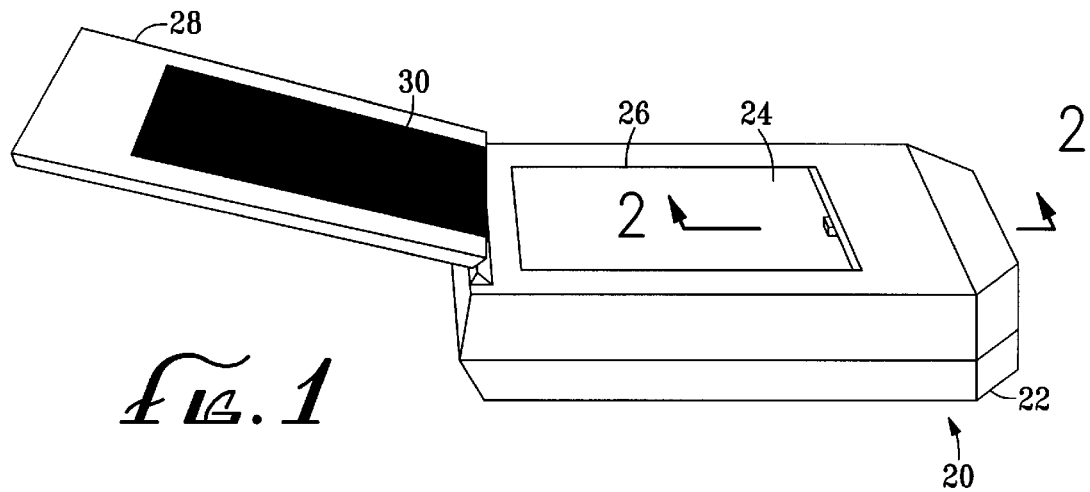
FIG. 1 is a perspective view of the optical scanner of the present invention.

With reference to the figures for purposes of illustration, the present invention is generally a reflective optical scanner 20 as illustrated in FIG. 1. The scanner includes generally a rectangular housing 22 with a reflective scanning platform 24. Located on the back side of the housing, the scanner may include conventional plugs for connecting the scanner to a power source and a standard interface port to connect with a personal computer (not shown). Used in a conventional manner, the personal computer receives digital data representative of the image scanned by the optical scanner. The reflective scanning platform 24 consists of a rectangular platen, preferably comprised of glass, secured in an aperture 26 within the upper surface of the housing 22. A lid 28, attached by a hinge to the rear end of the housing may be rotatably positioned to overlie the platen 26 to block out ambient light. The reflective scanning platform as described is conventional in design.

Noticeably, the lid 28 includes a mat 30 having a non-reflective surface which overlies the reflective platform when the lid 28 is closed. In the preferred embodiment, the mat 30 includes a black colored surface having a matte finish. The light absorbing properties of the color black and the dull surface of the matte finish, each alone and in combination, provide an essentially non-reflective surface.

Figure 2:
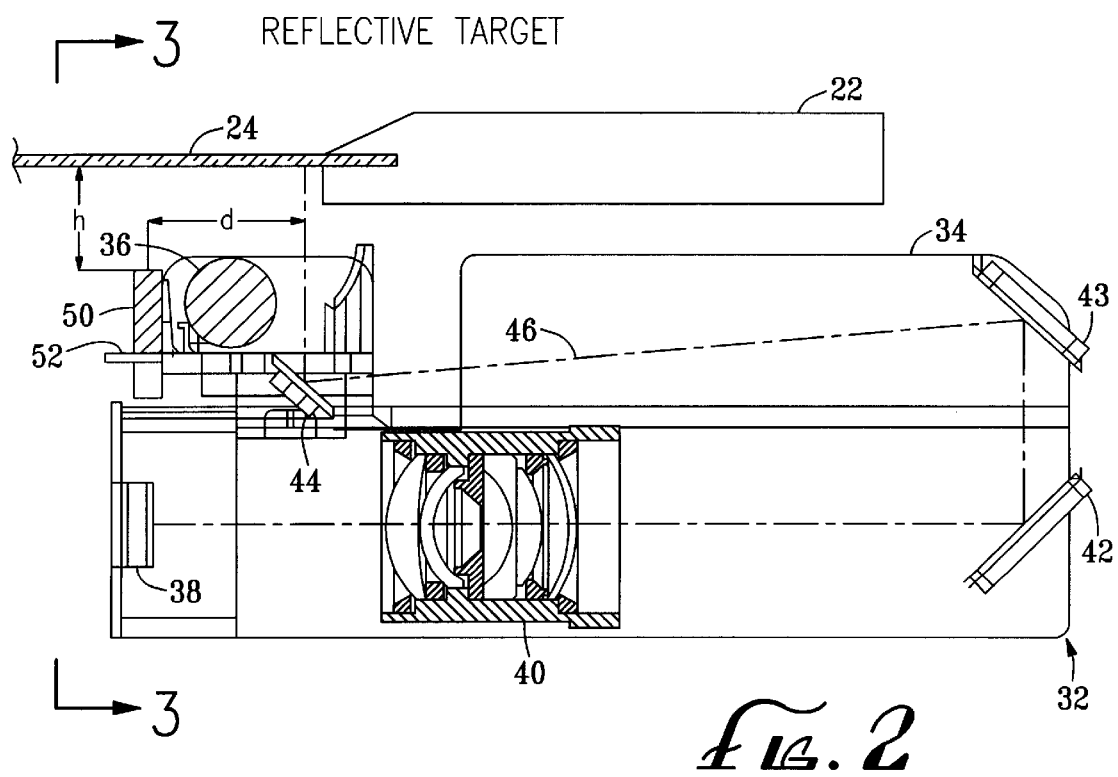
FIG. 2 is a partial, cut-away side view of the optical scanner of FIG. 1 taken along line 2—2 showing a scanning camera.

Underlying the reflective scanning platform 24 (FIG. 2) is a scanning camera 32. The scanning camera 32 includes a camera chassis 34 which is coupled to the housing 22. The scanning camera 32 conventionally includes a reflective light source 36 proximate the reflection platform 24. An opto-electrical transducer, such as a CCD 38, a conventional lens 40 and plurality of mirrors 42–44 aligned to form an optical pathway between the reflective platform 24 and the lens 40 as illustrated by line 46 extending from the reflective platform 24 to the CCD 38. The scanning camera 32 is assembled conventionally such that an image placed on the reflective platform 24 and illuminated by the reflective light source 36, projects light from the image, through the mirrors 42–44 and lens 40, and into the field of view of the CCD 38.

Relative movement of the scanning camera 32 and the reflective platform 24 may be achieved in any conventional manner. Such as driving the scanning camera 32 along a set of rails using a stepper motor to propel the camera (not shown). A motorized scanning camera of this type is disclosed in U.S. patent application Ser. No. 08/393,112 by Rubley et al. which is incorporated herein by reference. Alternatively, the platform 24 and lid 28 may be movable with respect to the scanner housing 22. In this embodiment, a motor conventionally connected to the platform propels the platform across the scanning camera (not shown). Both methods of achieving relative movement are conventional and either may be employed in the present invention. However, for purposes of illustrating the features of the preferred embodiment, the scanning apparatus described will be of the motorized scanning camera type.

Figure 3:
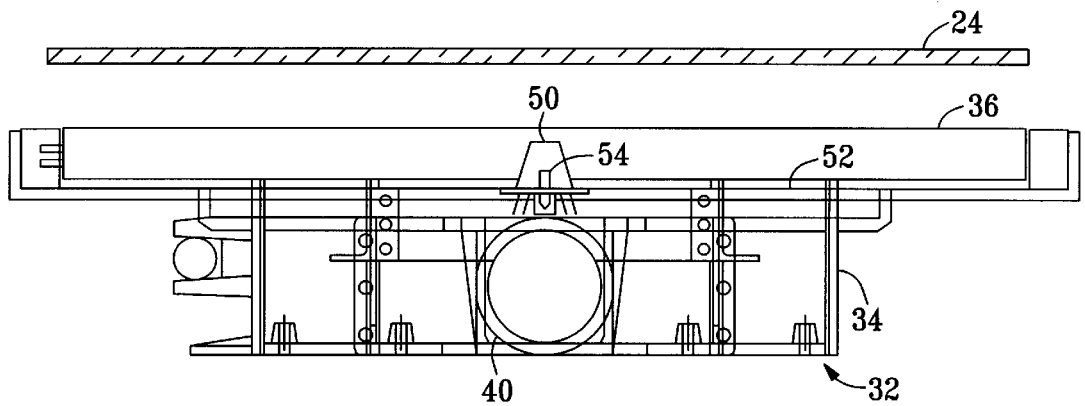
FIG. 3 is a partial side view of the scanning camera of FIG. 2 taken along line 3—3.

Advantageously, the present invention includes a sensor 50 (FIGS. 2 and 3) to detect the presence or absence of an image placed upon the reflective platform. The sensor is positioned atop the scanning camera 32 and aligned with the reflective platform 24. In the preferred embodiment, the sensor 50 is centered width-wise on the scanning camera 32 along the leading portion of the top surface 52. The leading portion is defined as any part of the scanning camera 32 that moves in relative relation across a document during scanning in front of the field of view of the CCD 38 through the optical pathway. The height of the reflective platform 24 from the sensor 50, illustrated in FIG. 2 by line h, is relative to the operational distance required for the type of sensor selected to detect the presence of paper. In the preferred embodiment, the sensor 50 is located a predetermined distance "d" from the field of view of the CCD 38, as illustrated by line d in FIG. 2. While the sensor 50 will perform adequately when positioned at other locations on the scanning camera 32, this location is preferred due to the central location which simplifies placement of an image by the user.

The sensor 50 (FIGS. 2 and 3) is preferably an optical sensor capable of detecting differences in light intensity from the reflective platform. A light emitting diode (LED) 54 (FIG. 3) is preferably provided with the sensor 50 to project light at the reflective platform. If a document or photograph has been placed upon the reflective platform, light from the LED 54 is reflected back to the sensor 50. The sensor 50, in turn, reacts to the light received from the object on the reflective platform 24 by generating a voltage level relative to the amount of light received. An optical sensor 50 and light emitting diode 54 of the type suitable for this purpose is manufactured by Honeywell and sold under model number HOA1405. The preferred distance h of such a sensor from the reflective platform is 13.7 mm.

The sensor 50 (FIG. 4) connects in circuit to the control circuit having a discriminator circuit 56. The discriminator circuit 56 is configured to receive the sensor 50 voltage corresponding to the light received by the sensor 50 and a predetermined threshold voltage. The output of the discriminator circuit 56 has two settings. A high voltage or a digital logic high value "1" is set when there is no paper detected and the scanner is drawn to ground or a digital logic low value "0" when paper has been detected.

The discriminator circuit 56 includes a voltage comparator 58 balanced between the circuit high voltage level 60 and ground 62. A first input lead 64 connects through a voltage balanced resistor 66 to the sensor output lead 68. The input lead 64 is further attenuated by a capacitor 70 connected to ground that stabilizes the voltage level of the circuit. A voltage divider circuit includes a pair of resistors 72 and 74 connected in series between the high voltage level 60 and ground 62. A second input lead 76 to the voltage comparator 58 connects to the voltage divider at the junction of the two resistors 72 and 74. The output lead 78 of the voltage comparator 58 is connected to the high voltage level 60 through a pull-up resistor 80. The output lead 78 comprises an interrupt lead on the CPU 82 included in the controller circuit.

In Operation

Figure 4:
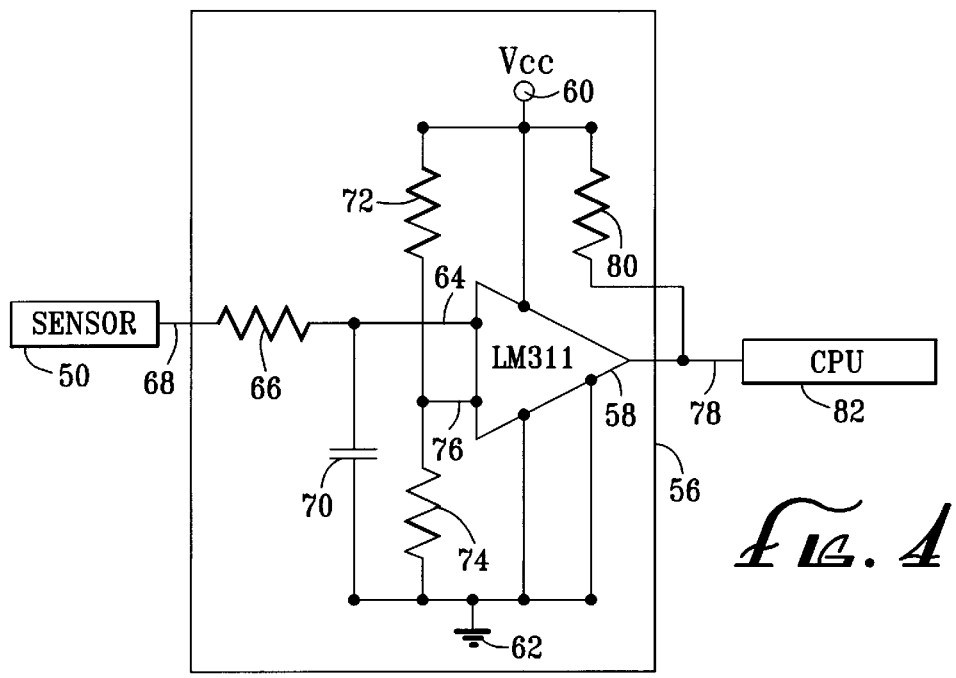
FIG. 4 is a schematic diagram of a sensor circuit of the present invention.

The sensor 50 (FIG. 2) operates by detecting reflected light from the LED 52 which is reflected back to the sensor 50 when an object has been placed on the reflective platform 24. The discriminator circuit 56 is configured to operate at a predetermined threshold. This threshold value may depend on the actual type of sensor 50 used, but should be sufficiently high to return a "no paper signal" when the lid is opened or closed. Thus, the black matte finish of the mat 30 (FIG. 1) on the lid 28, does not reflect sufficient light to generate a sensor signal value above the threshold value of the discriminator circuit 56 (FIG. 4). Likewise, ambient light from conventional indoor light does not project sufficient light to generate a sensor signal value greater than the threshold value to trigger the presence of an object. However, photographs with a glossy finish, regardless of color, do reflect sufficient light to have a sensor signal value above the threshold. In addition, a black field on an image from a laser printer produced at 600 DPI reflects sufficient light to have a sensor signal above the threshold value.

Figure 5:
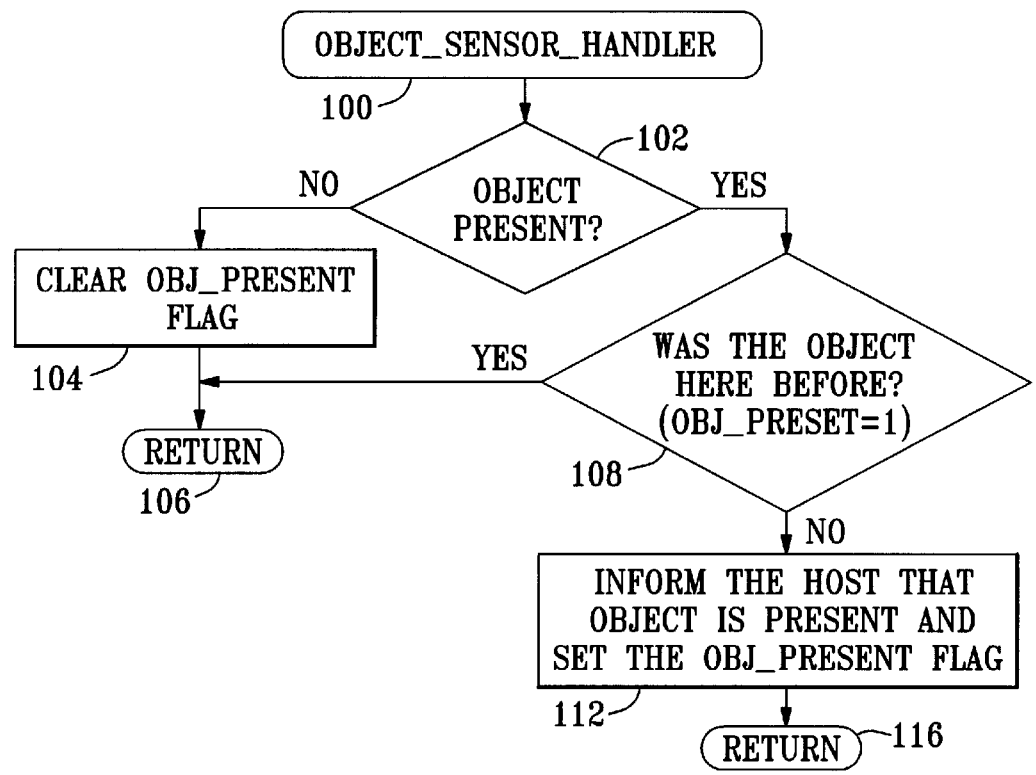
FIG. 5 is a flow diagram of an object present routine of the present invention.
Figure 6:
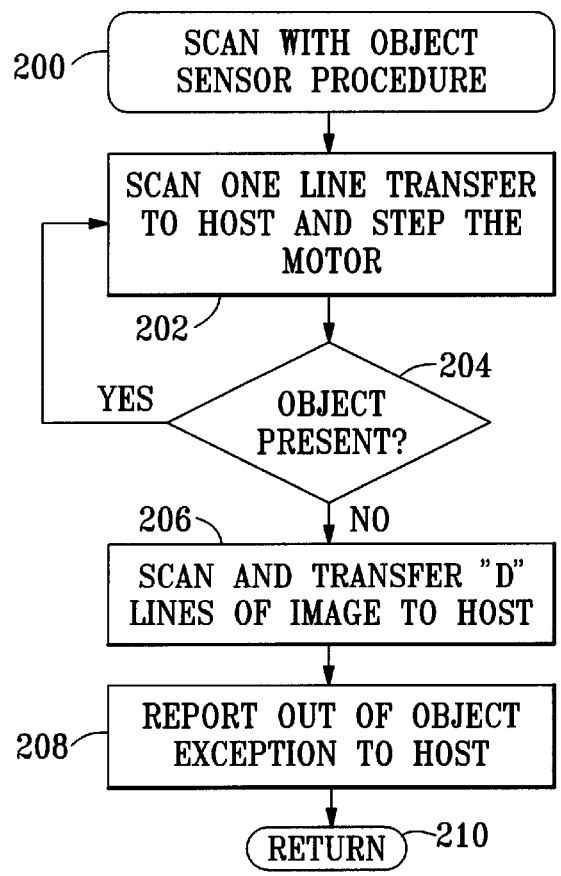
FIG. 6 is a flow diagram of an end of object routine of the present invention.

The CPU 82 (FIG. 4) includes two software subroutines 100 and 200 (FIGS. 5 and 6) which are responsive to the hardware interrupt from the discriminator circuit 56. The first new subroutine is an object sensor handler routine 100 (FIG. 5) that checks the discriminator 28 (FIG. 4) lead and detects the presence of paper. The second subroutine 200 (FIG. 6) is a scan with object sensor routine that detects the length of the object.

The object sensor handler routine 100 (FIG. 5) is included to check for the state of the discriminator output lead 78 (FIG. 4). A check-sensor-lead step 102 (FIG. 5) checks if an object is present. If the object is not present, the software flags are cleared 104 and the interrupt program returns 106 to the conventional software. If the object is present, the program continues to a check if object present flag set step 108. If the flag was set previously, the program returns 106 to the conventional software. If the flag was not set, then program continues to an inform host that object is present and a set object present flag step 112. The program then returns 116 to the conventional software. The host is typically the personal computer (not shown) attached to the scanner. The signal to inform the host could be any conventional flag or interrupt signal recognized by the PC commercial software. Preferably the object present signal is tailored to work with the commercial software to emulate a manual begin scanning signal. Such a configuration would eliminate the need for commercial vendors to tailor their programs for this feature.

The scan with object sensor routine 200 (FIG. 6) includes a scan line step 202 which calls a conventional scanner code routine to scan a line of the image and transfer the data to the host, such as a personal computer. At the end of each line scan, the scan with sensor routine performs a check for object step 204 which calls to the object sensor handler routine 100 to check, if the end of the image has been reached. If the object is still present, the routine returns to the scan line step 202. Otherwise, if the sensor no longer detects the image, the scanner assumes the end of the image has been reached. A scan and transfer "D" lines of image to host step 206 is performed. This step may preferably include "the scan line step" 202 nested within a do-until type loop. The "D" lines of image corresponds to the number of lines included within the distance "d" between the field of view of the CCD and the sensor. The number of lines corresponding to the value of "D" will vary for each type of conventional flat bed scanner the sensor may be used in. The variables that need to be considered include the actual measured distance which depends on the size of the light source and the dimension of the reflective platform 24 and scanning camera 32. In addition, the number of lines included in distance "d" will vary according the scan resolution used. For example, assuming that a fixed focus conventional scanning camera is used, when scanning at 600 dots per inch (DPI) the number of "D" lines would be twice as many as when scanning at 300 DPI.

Next, a report out of image signal to the host step 208 signals the host computer that the program has completed scanning the page. The program then returns 210 to the conventional software.

It will be understood that certain features and sub-combinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. An optical scanning apparatus comprising:

a reflective scanning platform;

a carriage including a surface, and mounted within a scanner housing and adapted for reciprocating movement along a line extending in a first direction parallel to the longitudinal centerline of the scanner;

a scanning camera having an opto-electrical transducer positioned proximate to said reflective scanning platform and adapted for movement relative to said platform and in a predetermined direction;

a first light source mounted on said scanning camera proximate the reflective platform and adapted to illuminate a first region of said platform along in the field of view of the scanning camera;

a control circuit connected in circuit with said scanning camera;

a second light source, mounted on said carriage, coupled to said scanning camera and adapted to illuminate a second region of said platform that is in front of the field of view of the scanning camera in the direction of movement;

an object sensor mounted on said scanning camera and adapted to sense light reflected back from said second region; and said control circuit including a discriminator circuit electrically connected to said sensor and said control circuit.

2. An optical scanning apparatus as set forth in claim 1 wherein said object sensor is an optical sensor aligned to detect light from said light source and reflected off an object placed upon said reflective scanning platform.

3. An optical scanning apparatus as set forth in claim 2 wherein:

said object sensor, in response to the presence of said object placed upon said reflective scanning platform, being operative to generate a sensor signal representative of the presence of said object.

4. An optical scanning apparatus as set forth in claim 3 wherein:

said control circuit in response to said sensor signal, being operative to determine said sensor signal is representative of the presence of said object upon said reflective scanning platform.

5. An optical scanning apparatus as set forth in claim 1 wherein said control circuit includes:

said discriminator circuit to discriminate between an object sensor signal from said object sensor and a threshold value;

means for checking for the presence of an object;

means for scanning said object incrementally; and means for detecting the end of said object.

6. An optical scanning apparatus as set forth in claim 1 wherein said optical sensor is aligned with said reflective platform and said light source such that upon an object being placed upon said reflective platform, light from said light source is received by said optical sensor by reflection off the object.

7. An optical scanning apparatus as set forth in claim 1 for scanning an object placed upon said reflective platform wherein said optical sensor is operative to receive light generated by said light source and reflected from said object.

8. An optical scanning apparatus as set forth in claim 1 wherein said object sensor positioned on said scanning camera is in spaced apart relation to said opto-electrical transducer.

9. An optical scanning apparatus as set forth in claim 8 including:

means for incrementally moving said scanning camera relative to said reflective platform; and said optical sensor being moved in spaced apart relation to said opto-electrical transducer.

10. An optical scanning apparatus as set forth in claim 9 including:

a scanner lid operatively attached to said scanner to selectively overlie said reflective platform and having a surface with light absorbing properties.

11. An optical scanning apparatus as set forth in claim 10 wherein said control circuit includes:

means for checking for the presence of an object;

means for scanning said object incrementally; and means for detecting the end of said object.

12. An optical scanning apparatus as set forth in claim 11 wherein said control circuit further includes:

means for incrementally scanning said object subsequent to detecting the end of said object.

13. An optical scanning apparatus as set forth in claim 12 wherein said object sensor is centered width-wise on said scanning camera.

14. An optical scanning apparatus as set forth in claim 13 wherein said object sensor includes a light emitting diode.

15. An optical scanning apparatus as set forth in claim 14 wherein said object sensor is mounted on the leading portion of said scanning camera.

16. An optical scanning apparatus for scanning an object comprising:

a scanner housing;

a scanning reflective platform formed in the upper surface of said scanner housing;

a cover having a relatively non-reflective region and a relatively reflective region and adapted to cover objects places on said platform;

a scanning camera having a CCD and positioned proximate to said reflective scanning platform;

at least one light source coupled to said scanning camera;

a control circuit connected in circuit with said scanning camera; and an object sensor mounted on said scanning camera in spaced apart relation to said CCD, adapted to sense light generated by said light source and reflected from the relatively non-reflective region of said cover and connected in circuit with said control circuit;

whereby in response to a first light reflection from said object placed upon said reflective scanning platform, a first signal is generated, and in response to a second light reflection from said relatively non-reflective region, a second signal is generated, when said first light reflection has greater luminance than the second light reflection.

17. An optical scanning apparatus for scanning of an object comprising:

a reflective scanning platform;

a carriage adapted for linear motion beneath said platform;

a scanning camera positioned on said carriage, proximate to said reflective scanning platform and adapted to detect reflections from said reflective platform that have been reflected from at least one mirror positioned in a light path between said platform and said camera;

a light source coupled to said scanning camera and adapted to illuminate a first region of said platform;

a CPU connected in circuit with said scanning camera;

an object sensor mounted on said carriage and adapted to detect reflections directly from said reflective scanning platform and at a time prior to detection of reflection by said camera; and a discriminator circuit electrically connected to said sensor and said CPU circuit to provide an output signal indicative of the presence or absence of an object to be scanned.

18. An optical scanning apparatus for scanning an object and determining the presence and absence of an object to be scanned comprising:

a reflective scanning platform;

a scanning camera adapted for reciprocating movement in a predetermined direction parallel to the longitudinal centerline of said reflective scanning platform;

at least one light source coupled to said scanning camera and adapted to illuminate said scanning platform;

an object sensor positioned and adapted to sense reflections of light directly through said platform and to generate a first signal indicative of the presence of an object and a second signal indicative of the absence of an object, said first signal and said second signal being proportional to the amount of light reflected;

a control circuit connected in circuit with said scanning camera, in circuit with said object sensor and including means for discriminating between said first signal and said second signal; and means for scanning said object incrementally and in response to said control circuit upon receipt of said first signal.

19. An optical scanning apparatus for reflective scanning an object, comprising:

a scanner housing;

a scanner lid operatively attached to said scanner housing, having a closed position and including a surface with light absorbing properties;

a reflective scanning platform;

said scanner lid in its closed position overlying said scanning platform;

a scanning camera having a predetermined field of view on said reflective scanning platform;

said scanning camera movable relative to said scanning platform to perform scanning in a scanning direction;

at least one light source coupled to said scanning camera and adapted to illuminate a region of the platform ahead of the field of view in the scanning direction;

a control circuit connected in circuit with said scanning camera and adapted to scan a object when the presence is detected;

an object sensor mounted on said scanning camera and adapted and positioned to generate signals proportional to intensity of light reflected from said platform under said surface and without being reflected from a mirror positioned in a light path between said platform and said camera; and said control circuit electrically connected to said object sensor and adapted to stop scanning of said object in response to receipt of said signals.

20. An optical scanning method, for implementation of scanning an object and detecting the presence oor absence of the object, in a scanner having at least one light source, an optical object sensor, a scanning camera and a control circuit mounted on a movable carriage and comprising the steps of:

moving said carriage in a line along a first direction from a position ahead of an object positioned on a stationary scanning platform positioned above said carriage to a position behind the object;

generating light from at least one light source and reflecting said light from said stationary scanning platform;

generating object sensor signals in said optical object sensor that are proportional to light reflected through said platform;

discriminating between first object sensor signals and second object sensor signals, the first signals corresponding to relatively low luminance and representative of ambient light reflected from said platform and the second object sensor signals representative of light corresponding to relatively high luminance and reflected from an object;

setting an interrupt flag upon receipt of said object sensor signals being greater than a threshold signal value;

checking for the presence of an object by checking said interrupt flag;

scanning said object incrementally; and detecting the end of said object.

* * * * *